United States Patent
Wu et al.

(10) Patent No.: US 12,261,481 B2
(45) Date of Patent: Mar. 25, 2025

(54) FAN

(71) Applicants: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(72) Inventors: Di Wu, Guangdong (CN); Guyu Wu, Guangdong (CN); Yiming Hu, Guangdong (CN); Liming Gong, Guangdong (CN); Ping Li, Guangdong (CN)

(73) Assignees: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(*) Notice: Subject to any disclaimer, the term of this patent is extended or adjusted under 35 U.S.C. 154(b) by 367 days.

(21) Appl. No.: 17/512,878

(22) Filed: Oct. 28, 2021

(65) Prior Publication Data
US 2022/0052567 A1 Feb. 17, 2022

Related U.S. Application Data

(63) Continuation of application No. PCT/CN2019/114160, filed on Oct. 29, 2019.

(30) Foreign Application Priority Data

Apr. 29, 2019 (CN) .......................... 201910355989.0
Apr. 29, 2019 (CN) .......................... 201920608059.7

(51) Int. Cl.
*H02K 1/14* (2006.01)
*H02K 1/16* (2006.01)
(Continued)

(52) U.S. Cl.
CPC ............... *H02K 1/148* (2013.01); *H02K 1/16* (2013.01); *H02K 1/18* (2013.01); *H02K 7/14* (2013.01)

(58) Field of Classification Search
CPC ........ H02K 1/146; H02K 1/148; H02K 1/182; H02K 1/2793; H02K 1/2795; H02K 1/2796; H02K 1/2798
See application file for complete search history.

(56) References Cited

U.S. PATENT DOCUMENTS 6,181,040 B1 * 1/2001 Schob .................. A61M 60/113
310/90.5
9,997,982 B2 * 6/2018 Saint-Michel ....... H02K 21/048
(Continued)

FOREIGN PATENT DOCUMENTS

| CN | 1685585 A | 10/2005 |
|---|---|---|
| CN | 101505080 A | 8/2009 |

(Continued)

OTHER PUBLICATIONS

JP-2008228363—Machine Translation (Year: 2008).*
(Continued)

*Primary Examiner* — Tran N Nguyen
*Assistant Examiner* — Masoud Vaziri
(74) *Attorney, Agent, or Firm* — Scully, Scott, Murphy & Presser, P.C.

(57) ABSTRACT

A fan is provided. The fan has a motor and a first rotating shaft. The motor has a stator assembly, a rotor and a winding. The stator assembly has a stator yoke portion and a stator tooth detachably connected to each other. The winding is wound on the stator tooth. The stator yoke portion has a stator yoke slot and/or a stator projection, adapted to the shape of the stator tooth. The stator tooth axially pass through the stator yoke slot and/or the stator projection to
(Continued)

form a stator core. A first fan blade is arranged at an end of the first rotating shaft to rotate the first fan blade when the first rotating shaft rotates.

11 Claims, 8 Drawing Sheets

(51) Int. Cl.
*H02K 1/18* (2006.01)
*H02K 7/14* (2006.01)

(56) References Cited

U.S. PATENT DOCUMENTS

| | | | |
|---|---|---|---|
| 10,707,734 B2* | 7/2020 | Holenstein | B01F 33/4535 |
| 2003/0057796 A1 | 3/2003 | Fan et al. | |
| 2006/0208606 A1* | 9/2006 | Hirzel | H02K 1/02 |
| | | | 310/216.074 |
| 2010/0072831 A1 | 3/2010 | Gadelmeier | |
| 2010/0225195 A1* | 9/2010 | Asano | H02K 1/02 |
| | | | 310/216.067 |
| 2010/0259125 A1* | 10/2010 | Asano | F04C 23/02 |
| | | | 310/216.015 |
| 2017/0054352 A1* | 2/2017 | Li | H02K 19/04 |
| 2018/0145574 A1* | 5/2018 | Mccaw | H02K 9/06 |
| 2018/0363664 A1* | 12/2018 | Daneshkhah | H02K 9/06 |
| 2019/0199186 A1* | 6/2019 | Noh | H02K 21/20 |

FOREIGN PATENT DOCUMENTS

| | | |
|---|---|---|
| CN | 106712326 A | 5/2017 |
| CN | 106849399 A | 6/2017 |
| CN | 109302027 A | 2/2019 |
| CN | 209497375 U | 10/2019 |
| EP | 2012408 A1 | 1/2009 |
| JP | 3639371 B2 | 4/2005 |
| JP | 2008-061299 A | 3/2008 |
| JP | 2008228363 A * | 9/2008 |

OTHER PUBLICATIONS

JP 2008228363 A—Machine Translation (Year: 2008).*
JP-2008228363-A (Year: 2008).*
Extended European Search Report dated May 3, 2022 received in European Patent Application No. EP 19926832.7.
International Search Report dated Jan. 2, 2020 received in International Application No. PCT/CN2019/114160 together with an English language translation.
First Office Action dated Oct. 23, 2024 received in Chinese Patent Application No. 201910355989.0.
Office Action dated Sep. 23, 2024 received in European Patent Application No. 19926832.7.

* cited by examiner

FAN

CROSS-REFERENCE TO RELATED APPLICATIONS

The present application is a continuation application of PCT International Application No. PCT/CN2019/114160, filed on Oct. 29, 2019, which claims the priority to and benefits of Chinese Patent Application No. 201910355989.0 filed with China National Intellectual Property Administration on Apr. 29, 2019 and entitled "FAN", and claims the priority to Chinese Patent Application No. 201920608059.7 filed with China National Intellectual Property Administration on Apr. 29, 2019 and entitled "FAN". The entire content of each of Chinese Patent Application No. 201910355989.0 and Chinese Patent Application No. 201920608059.7 is incorporated herein by reference for all purposes. No new matter has been introduced.

FIELD

The present disclosure relates to the technical field of fans, in particular to an electrical fan.

BACKGROUND

The motor in the fan usually adopts a radial motor. When winding operation is carried out, due to the fact that the size of the winding groove of the winding is relatively fixed, the power level of the stator core is limited. In addition, the corresponding operating power is set before each winding operation, which greatly affects the application scope of a product. Meanwhile, the winding efficiency is also affected due to a single winding mode.

SUMMARY

The present disclosure solves at least one of the technical problems existing in the prior art or the related art.

Accordingly, it is an object of the present disclosure to provide a fan.

In order to achieve the above object, the embodiment of the present disclosure provides a fan, comprising: a motor including at least one stator assembly, at least one rotor arranged correspondingly to the stator assembly and a winding, wherein the stator assembly comprises a stator yoke portion and at least one stator tooth which are detachably connected to each other; the winding is wound on the stator tooth; the stator yoke portion is provided with a stator yoke slot and/or a stator projection adapted to the shape of the stator tooth; and the stator tooth axially pass through the stator yoke slot and/or the stator projection to form a stator core. The fan also comprises a first rotating shaft connected to at least one rotor, wherein a first fan blade is arranged at one end of the first rotating shaft to rotate the first fan blade when the first rotating shaft rotates.

According to the embodiment, the stator assembly comprises a stator yoke portion and at least one stator tooth which are detachably connected to each other, a winding is wound on the stator tooth, the stator yoke portion is provided with a stator yoke slot adapted to the shape of the stator tooth, and the stator tooth axially passes through the stator yoke slot or is inserted into the stator projection to form a stator core. This structure is simple and compact, the winding process is convenient and easy to operate, and the power expansion capacity of the motor is good; and the rotor and the first fan blade are connected by the first rotating shaft, so that the first fan blade can be driven to rotate by the first rotating shaft when the rotor rotates, and the wind power generated by the first fan blade can also be expanded along with the expansion of the motor power.

The rotor can be a permanent magnet rotor or a squirrel cage rotor or a salient pole rotor. Particularly, when the rotor is a permanent magnet rotor, the permanent magnet rotor can also be a radial flux rotor or an axial flux rotor; and the magnetic steel structure of the permanent magnet rotor can be surface-mounted or embedded types and can also be in the form of a Halbach array.

In the above embodiment, the stator yoke portion comprises a plurality of first magnetic conductive sheets laminated along the radial direction or the axial direction of the stator core.

In the embodiment, the stator yoke portion comprises a plurality of first magnetic conductive sheets, and the magnetic permeability of the stator core is improved by laminating the plurality of first magnetic conductive sheets along the radial direction or the axial direction of the stator core. For example, the lamination direction of the first magnetic conductive sheet can be radial or axial, and the lamination direction can be flexibly adjusted according to specific use scenarios and processing requirements.

In the embodiment, the stator yoke portion has a ring shape, an oval ring shape, and a polygonal ring shape, and the stator yoke slot extends through at least one end surface of the stator yoke portion in the axial direction.

According to the embodiment, the stator yoke portion has a ring shape, and the ring structure is regular, which is convenient for machining and forming and suitable for batch production; the stator yoke portion can be an oval ring shape or a polygonal ring shape, the stator yoke slot passes through at least two end faces of the stator yoke portion in the axial direction, and the stator tooth passes through the stator yoke slot to be connected to the stator yoke portion conveniently, so that the assembling efficiency and the connecting reliability of the stator tooth and the stator yoke portion are improved.

According to the embodiment, a distance exists between the stator yoke slot and an outer peripheral surface of the stator yoke portion in the radial direction, and a distance exists between the stator yoke slot and an inner peripheral surface of the stator yoke portion in the radial direction; or the stator yoke slot is communicated with the outer peripheral surface and/or the inner peripheral surface of the stator yoke portion.

In the embodiment, a distance exists between the stator yoke slot and an outer peripheral surface of the stator yoke portion in the radial direction, that is, the stator yoke slot passes through the stator yoke portion and is not communicated with the outer peripheral surface of the stator yoke portion, and the stator tooth is inserted into the stator yoke slot in the axial direction of the stator yoke portion to be connected to the stator yoke portion. Therefore, the stator tooth is prevented from being separated from the stator yoke portion along the outer peripheral surface or the inner peripheral surface of the stator yoke portion from the stator yoke slot, and the connection reliability of the stator tooth and the stator yoke portion is improved.

The stator yoke slot is communicated with the outer peripheral surface or the inner peripheral surface of the stator yoke portion, so that the stator tooth can be inserted into the stator yoke slot from the outer peripheral surface or the inner peripheral surface of the stator yoke portion; and the connection mode is flexible and adaptable, and the assembly between the stator tooth and the stator yoke portion is facilitated.

The stator yoke slot is simultaneously communicated with the outer peripheral surface and the inner peripheral surface of the stator yoke portion, so that the stator tooth can be axially or radially inserted into the stator yoke slot from the outer peripheral surface to form a complete stator core.

According to the embodiment, the stator projection is formed by extending the outer peripheral surface of the stator yoke portion radially outwards; and/or, the stator projection is formed by extending the inner peripheral surface of the stator yoke portion radially inwards.

The stator projection is formed by extending the outer peripheral surface of the stator yoke portion radially outwards. Optionally, the stator tooth is provided with a groove. When the stator tooth is connected to the stator yoke portion, the stator tooth and the stator yoke portion can be quickly assembled by inserting the groove on the stator tooth into the stator projection on the outer peripheral surface of the stator yoke portion.

Of course, the stator projection can also be formed by extending the inner peripheral surface of the stator yoke portion radially inwards. Optionally, the stator tooth is provided with a groove. When the stator tooth is connected to the stator yoke portion, the stator tooth and the stator yoke portion can be quickly assembled by inserting the groove on the stator tooth into the stator projection on the inner peripheral surface of the stator yoke portion.

In the above embodiment, the stator yoke portion comprises a plurality of first magnetic conductive sheets laminated along the radial direction or the axial direction of the stator core. The stator tooth comprises a stator tooth body including a plurality of second magnetic conductive sheets laminated along the radial direction or a circumferential direction of the stator core.

In the embodiment, the stator yoke portion comprises a plurality of first magnetic conductive sheets, and the magnetic permeability of the stator core is improved by laminating the plurality of first magnetic conductive sheets along the radial direction or the axial direction of the stator core. For example, the lamination direction of the first magnetic conductive sheet can be radial or axial, and the lamination direction can be flexibly adjusted according to specific use scenarios and processing requirements. The stator tooth comprises a stator tooth body including a plurality of second magnetic conductive sheets, and the magnetic permeability of the stator core is further improved by laminating the plurality of second magnetic conductive sheets along the radial direction or the circumferential direction of the stator core.

The lamination direction of the second magnetic conductive sheets is perpendicular to the lamination direction of the first magnetic conductive sheets, and the magnetic permeability of the stator core is further improved.

In the embodiment, the stator tooth further comprises a stator tooth shoe arranged at an end portion of the stator tooth body and detachably connected to the stator tooth body.

The stator tooth further comprises a stator tooth shoe arranged at the end portion of the stator tooth body. The stator tooth shoe is detachably connected to the stator tooth body, so that after the winding is wound on the stator tooth body, the stator tooth shoe is connected to the stator tooth body. The effect of fixing the winding is achieved, the winding is prevented from being separated from the stator tooth body, and the assembly efficiency of the winding and the stator tooth is further improved.

It should be noted that the material of the stator tooth body and the stator tooth shoe may be the same or different.

In the embodiment, the stator tooth shoe and the stator tooth body are integrally formed.

According to the embodiment, the stator tooth shoe and the stator tooth body are integrally formed, which simplifies the structure of the product and makes the integrity of the product better. In addition, the connecting step of the stator tooth shoe and the stator tooth body is omitted, and the assembling efficiency of the product is further improved.

In the embodiment, the number of the stator tooth shoe is one, and the stator tooth shoe is arranged at one end of the stator tooth body; or the number of the stator tooth shoes is two, and the stator tooth body is provided at both ends with one of the stator tooth shoes respectively.

According to the embodiment, the number of the stator tooth shoes arranged on each stator tooth body can be adjusted according to actual requirements. For example, one stator tooth shoe can be arranged on one stator tooth body, and two stator tooth shoes can be arranged on one stator tooth body.

It should be noted that two stator tooth shoes may be provided on both end faces of the stator tooth body, respectively.

In the embodiment, the stator assembly further comprises a matching groove and a matching rib adapted to each other in the shape, wherein one of the matching groove and the matching rib is arranged on the stator tooth body, and the other of the matching groove and the matching rib is arranged on the stator tooth shoe, so that the stator tooth shoe is connected to the stator tooth body by the matching of the matching groove and the matching rib.

By arranging the matching ribs on the stator tooth body and arranging the matching groove on the stator tooth shoe, when the stator tooth shoe and the stator tooth body are assembled, the matching rib is directly inserted into the matching groove, so that the relative movement between the stator tooth shoe and the stator tooth body is limited, the assembling efficiency of the stator tooth shoe and the stator tooth body is improved, and the connection stability of the stator tooth shoe and the stator tooth body is improved.

In the embodiment, the number of the stator yoke slots and/or the stator projections is plural, and the plurality of stator yoke slots and/or the stator projections are uniformly arranged on the stator yoke portion around an axis of the stator core.

According to the embodiment, the number of the stator yoke slots is plural, and the plurality of stator yoke slots or the stator projections are uniformly arranged on the stator yoke portion around the axis of the stator core, so that the structure of the product is more regular. In addition, the number of the stator yoke slots or the stator projections is increased. Accordingly, the number of the stator teeth is plural, and the plurality of the stator teeth are inserted into the plurality of stator yoke slots corresponding thereto. Therefore, the number of the windings is increased, and the power level of the stator core is improved.

In the embodiment, the stator yoke slot comprises at least two yoke slots, each of which has a distance between the stator yoke slot and the outer peripheral surface of the stator yoke portion in the radial direction, and a distance between the stator yoke slot and the inner peripheral surface of the stator yoke portion in the radial direction; or wherein each of the yoke slots is communicated with the outer peripheral surface and/or the inner peripheral surface of the stator yoke portion.

In the embodiment, the types of the yoke slots are various. Each yoke slot can be simultaneously communicated with the inner or outer peripheral surfaces or both the inner and outer peripheral surfaces of the stator yoke portion, and also can be not communicated with the inner and outer peripheral surfaces of the stator yoke portion, so that more stator teeth can be positioned on the stator yoke portion to meet the use requirements of different practical motors.

Here, the types of the yoke slot may be divided according to the distance of the yoke slot from the axis of the stator core, the shape of the yoke slot, or the size of the yoke slot. In the embodiment, the stator yoke slot comprises: at least one first yoke slot communicated with the outer peripheral surface of the stator yoke portion; and at least two second yoke slots communicated with the inner peripheral surface of the stator yoke portion, wherein a receiving space is formed between ends of at least two stator teeth provided in the second yoke slot; wherein a second rotating shaft at a non-zero angle with at least one first rotating shaft is arranged in the receiving space, and a second fan blade is arranged on at least one end of the second rotating shaft.

In the embodiment, two types of stator yoke slots are respectively a first yoke slot and a second yoke slot, wherein the number of the first yoke slots can be one or plural, and the first yoke slots are communicated with the outer peripheral surface of the stator yoke portion; the number of the second yoke slots is plural, and the second yoke slots are communicated with the inner peripheral surface of the stator yoke portion. The stator teeth are inserted between the first yoke slot and the second yoke slot, respectively, while a receiving space is formed between the ends of the at least two stator teeth, and a second rotating shaft and a second fan blade fixedly connected to one end of the second rotating shaft are arranged in the receiving space. Therefore, on one hand, the structure is compact and simple, and the two rotating shafts can be driven to rotate; and on the other hand, the axial direction of the second rotating shaft can be the same as or different from the axial direction of the stator, so that the wind direction can be adjusted at will along with the axial change of the second rotating shaft, and the design flexibility of the fan is improved.

In the embodiment, the fan further comprises a casing sleeved outside the motor, wherein the first rotating shaft extends out of the casing, the fan blade is sleeved on the first rotating shaft, and the fan blade is arranged outside the casing.

According to the embodiment, the casing is arranged outside the motor, and the first rotating shaft extends out of the end face of the casing, so that the motor can be protected, the fan can be directly connected to the rotating shaft outside the casing, and installation convenience is improved.

It should be noted that the first rotating shaft may extend out of the housing by a side wall of the casing and may also extend out by an end face of the casing.

When the number of the first rotating shafts is plural, at least two first rotating shafts are arranged in parallel, or a non-zero angle can be formed between the at least two first rotating shafts, and the casing can be adjusted according to a specific use scene, so that the applicability of the product is improved.

In the embodiment, the fan further comprises an end cover being arranged at least one end of the casing, wherein a through hole corresponding to the first rotating shaft is formed in the end cover, and the first rotating shaft passes through the through hole to extend out of the end cover.

According to the embodiment, the end cover is arranged on at least one end of the casing, so that the casing is conveniently closed to avoid the influence of foreign matter invasion on the working of the fan; and the first rotating shaft passes through the through hole to extend out of the end cover, so that it is convenient to mount the fan blades to improve the mounting convenience.

According to the embodiment, the positioning groove and the positioning rib adapted to each other in the shape, wherein one of the positioning groove and the positioning rib is arranged on the stator tooth, and the other of the positioning groove and the positioning rib is arranged on the stator yoke slot and/or the stator projection so as to limit the position of the stator tooth at the stator yoke portion.

Due to the fact that the positioning ribs are arranged on the stator teeth, the positioning grooves are arranged on the stator yoke slots or the stator projections, or the positioning grooves are arranged on both the stator yoke slots and the stator projections, the positioning ribs are inserted into the positioning grooves to play a limiting role when the stator teeth and the stator yoke portions are assembled, so that the stator teeth and the stator yoke portions are prevented from moving relatively; furthermore, the connection stability of the stator teeth and the stator yoke portions is improved.

In the same way, the positioning grooves can be formed in the stator teeth, the positioning ribs are arranged on the stator yoke slots or the stator projections, or the positioning ribs are arranged on both the stator yoke slots and the stator projections, the positioning ribs are inserted into the positioning grooves to play a limiting role when the stator teeth and the stator yoke portions are assembled, so that the stator teeth and the stator yoke portions are prevented from moving relatively; furthermore, the connection stability of the stator teeth and the stator yoke portion is improved.

The embodiment further comprises that the number of the stator assemblies is a first number, the number of the rotors is a second number, the first number is less than the second number, and each stator assembly is arranged between any two adjacent rotors; and the first number is greater than the second number, and each rotor is arranged between any two adjacent stator assemblies.

In the embodiment, the number of the stator assemblies is set as a first number, the number of the rotors is set as a second number, and the first number is less than the second number, that is, the number of the stator assemblies is less than the number of the rotors. The stator assemblies are arranged between any two adjacent rotors, and any two adjacent rotors share one stator assembly. The structure is regular, the structure of a product is simplified, and the assembly of the rotor and the stator assembly is facilitated.

Alternatively, the number of the stator assemblies is greater than that of the rotors, and each rotor is arranged between any two adjacent stator assemblies, that is, any two adjacent stator assemblies share one rotor. The structure is regular, the structure of a product is simplified, and the assembly of the rotor and the stator assembly is facilitated.

In the embodiment, the number of the stator assemblies is at least two, the at least two stator assemblies have the same number of stator teeth, or the at least two stator assemblies have the same number of phases; or the number of the stator assemblies is at least two, the at least two stator assemblies have different numbers of stator teeth, or the at least two stator assemblies have different numbers of phases.

In the embodiment, the number of stator assemblies is at least two, and the at least two stator assemblies have the same number of stator teeth, so that the assembly of the stator teeth and the stator yoke portion is facilitated; or the at least two stator assemblies have the same number of phases, that is, the number of windings on each stator assembly is the same, so that the power level on each stator assembly is the same.

The number of the stator assemblies is at least two, and the at least two stator assemblies have different numbers of stator teeth, or the at least two stator assemblies have different numbers of phases, that is, the number of windings on each stator assembly is different, so that reasonable windings on each stator assembly can be made by a user to meet the need for actual power.

In the embodiment, the number of the windings is plural, and each of the windings is wound on at least one of the stator teeth.

In the embodiment, the number of the windings is plural, and each of the windings is wound on at least one of the stator teeth so as to ensure that the motor can operate normally and ensure that the motor can do work so to meet the requirements of the user.

In the embodiment, the material of the stator yoke portion comprises at least one of a soft magnetic material or a solid material; and the material of the stator teeth includes at least one of a soft magnetic material or a solid material.

The material of the stator yoke portion and the material of the stator tooth can be one or more combinations of soft magnetic materials or solid materials. For example, the two structures can be at least one of silicon steel sheets made of solid steel and powder formed of soft magnetic materials. For example, the stator yoke portion is made of silicon steel sheets, or the stator tooth is made of soft magnetic powders. Alternatively, the stator yoke portion is made of soft magnetic powders, or the stator yoke portion is made of silicon steel sheets, or any combination thereof is used.

Additional aspects and advantages of the disclosure will be apparent from the following description, or may be learned by practice of the disclosure.

Figure 1:
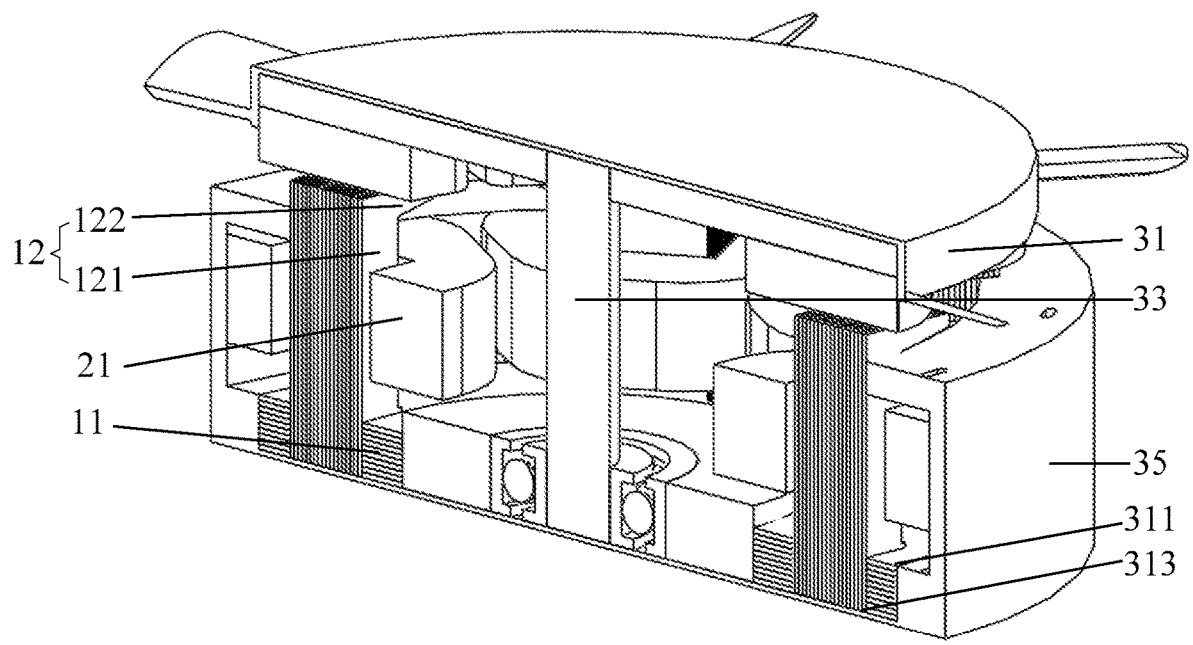
FIG. 1 is a schematic view showing a partial structure of a fan according to an embodiment of the present disclosure.

In the drawings, the corresponding relationship between the reference numerals and the component names in FIGS. 1 to 15 is as follows:

1 stator core, 11 stator yoke portion, 111 stator yoke slot, 12 stator tooth, 121 stator tooth body, 1211 positioning rib, 122 stator tooth shoe, 1221 matching rib, 123 matching groove, 13 second stator tooth, 131 second stator tooth body, 132 second stator tooth shoe, 2 rotor, 201 magnet steel, 202 rotor yoke, 21 winding, 3 fan, 31 first fan blade, 32 second fan blade, 33 first rotating shaft, 34 second rotating shaft, 35 casing, 36 end cover, and 37 bearing.

DETAILED DESCRIPTION OF THE DISCLOSURE

In order that the above objects, features and advantages of the present disclosure may be more clearly understood, the present disclosure is described in further detail below with reference to the accompanying drawings and detailed description. It should be noted that the embodiments and the features in the embodiments herein may be combined with one another without conflict.

In the following description, numerous specific details are set forth in order to provide a thorough understanding of the present disclosure. However, the present disclosure may be practiced otherwise than as described herein. Therefore, the scope of the present disclosure is not limited to the specific embodiments disclosed below.

A fan according to some embodiments of the present disclosure is described below with reference to FIGS. 1-15.

As shown in FIG. 1, an embodiment of the present disclosure provides a fan 3. The fan includes a motor. The motor includes at least one stator assembly, at least one rotor arranged correspondingly to the stator assembly, and at least one winding. The stator assembly comprises a stator yoke portion 11 and at least one stator tooth 12 which are detachably connected to each other. The winding 21 is wound on the stator tooth 12. The stator yoke portion 11 is provided with a stator yoke slot 111 and/or a stator projection which can be adapted to the shape of the stator tooth 12. The stator tooth 12 axially passes through the stator yoke slot 111 and/or the stator projection to form a stator core 1. The fan also comprises a first rotating shaft 33 connected to at least one rotor. A first fan blade 31 of the fan is arranged at one end of the first rotating shaft 33 to rotate the first fan blade 31 when the first rotating shaft 33 rotates.

As to the materials of the stator tooth 12 and the stator yoke portion 11, a magnetic conductive material such as a silicon steel sheet, a soft magnetic material or a solid steel is preferable. Since the purposes of the present disclosure can be achieved, all these options are within the scope of protection of the present disclosure.

In this embodiment, the stator assembly comprises a stator yoke portion 11 and at least one stator tooth 12 which are detachably connected to each other, a winding 21 is wound on the stator tooth 12, the stator yoke portion 11 is provided with a stator yoke slot 111 which is adapted to the shape of the stator tooth 12, and the stator tooth 12 axially passes through the stator yoke slot 111 or is inserted into the stator projection to form a stator core 1. This structure is simple and compact, the winding process is convenient and easy to operate, and the power expansion capacity of the motor is satisfactory; and the rotor and the first fan blade 31 are connected by the first rotating shaft 33, so that the first fan blade 31 can be driven to rotate by the first rotating shaft 33 when the rotor rotates, and the wind power generated by the first fan blade 31 can also be expanded along with the expansion of the motor power.

The specific structure of the fan 3 provided in the present disclosure will be described in detail with reference to some embodiments.

Embodiment 1

Figure 2:
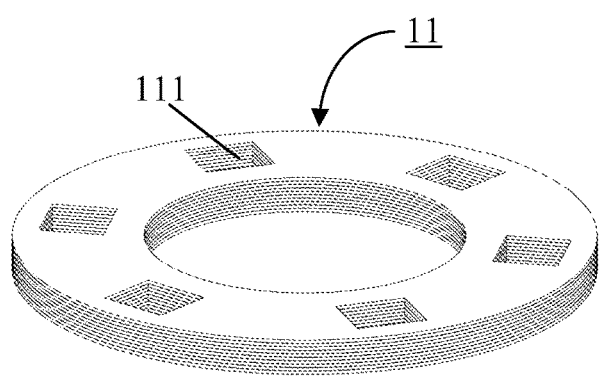
FIG. 2 is a structural schematic view of a stator yoke portion of the fan of FIG. 1.

The stator yoke portion 11 comprises a plurality of first magnetic conductive sheets laminated along the radial direction or the axial direction of the stator core 1, as shown in FIG. 2.

In this embodiment, the stator yoke portion 11 comprises a plurality of first magnetic conductive sheets, and the magnetic permeability of the stator core 1 is improved by laminating the plurality of first magnetic conductive sheets along the radial direction or the axial direction of the stator core 1.

Optionally, the stator yoke portion 11 can have a ring shape, an oval ring shape, or a polygonal ring shape, and the stator yoke slot 111 extends through at least one end face of the stator yoke portion 11 in the axial direction.

In this embodiment, the stator yoke portion 11 has a ring shape, and the ring structure is regular, which is convenient for machining and forming and suitable for mass production; the stator yoke portion 11 can be an oval ring shape or a polygonal ring shape, the stator yoke slot 111 passes through at least two end faces of the stator yoke portion 11 in the axial direction, and the stator tooth 12 passes through the stator yoke slot 111 to be connected to the stator yoke portion 11 conveniently, so that the assembling efficiency and the connecting reliability of the stator tooth 12 and the stator yoke portion 11 are improved.

Optionally, a distance exists between the stator yoke slot 111 and an outer peripheral surface of the stator yoke portion 11 in the radial direction, and a distance exists between the stator yoke slot 111 and an inner peripheral surface of the stator yoke portion 11 in the radial direction, as shown in FIG. 2.

In this embodiment, a distance exists between the stator yoke slot 111 and an outer peripheral surface of the stator yoke portion 11 in the radial direction, that is, the stator yoke slot 111 passes through the stator yoke portion 11 and is not communicated with the outer peripheral surface of the stator yoke portion 11, and the stator tooth 12 is inserted into the stator yoke slot 111 in the axial direction of the stator yoke portion 11 to be connected to the stator yoke portion 11. Therefore, the stator tooth 12 is prevented from being separated from the stator yoke portion 11 along the outer peripheral surface or the inner peripheral surface of the stator yoke portion 11 from the stator yoke slot 111, and the connection reliability of the stator tooth 12 and the stator yoke portion 11 is improved.

Optionally, the stator yoke slot 111 is simultaneously communicated with the outer peripheral surface and the inner peripheral surface of the stator yoke portion. At the same time, the stator tooth can be axially or radially inserted into the stator yoke slot from the outer peripheral surface to form a complete stator core.

Embodiment 2

Figure 11:
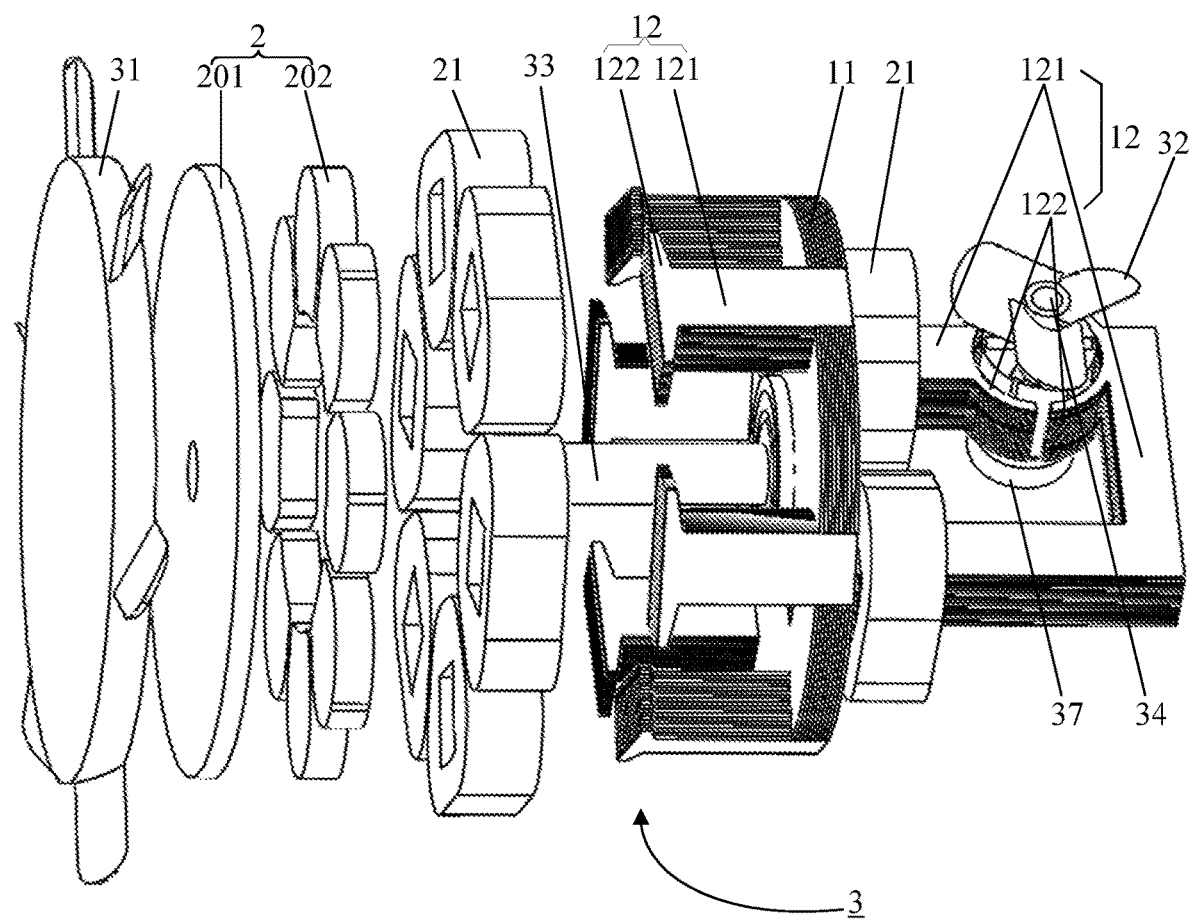
FIG. 11 is an exploded structural view of a fan according to yet another embodiment of the present disclosure.

The difference from Embodiment 1 is as follows: the stator yoke slot 111 is communicated with the outer peripheral surface of the stator yoke portion 11, as shown in FIG. 11.

The stator yoke slot 111 is communicated with the outer peripheral surface of the stator yoke portion 11, so that the stator tooth 12 can be inserted into the stator yoke slot 111 from the outer peripheral surface or the inner peripheral surface of the stator yoke portion 11; and the connection mode is flexible and adaptable, and the assembly between the stator tooth 12 and the stator yoke portion 11 is facilitated.

When the stator yoke portion 11 shown in FIG. 11 is adopted, two disc rotors can be arranged on the same side of the stator yoke portion 11, and the rotors can also be arranged on different sides of the stator yoke portion 11. Namely, one rotor is respectively arranged on two sides, and the disc rotors can also be radial rotors.

Embodiment 3

Figure 6:
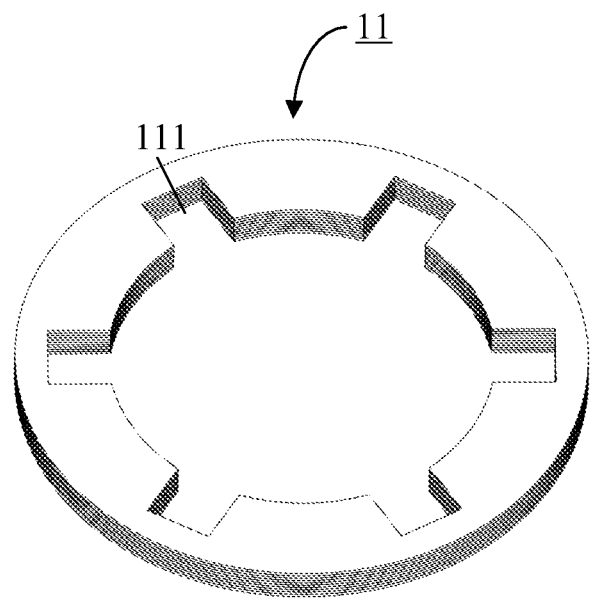
FIG. 6 is a structural schematic view of a stator yoke portion of the fan of FIG. 5.

The difference from Embodiment 2 is as follows: the stator yoke slot 111 is communicated with the inner peripheral surface of the stator yoke portion 11, as shown in FIG. 6.

The stator yoke slot 111 is communicated with the inner peripheral surface of the stator yoke portion 11, so that the stator tooth 12 can be inserted into the stator yoke slot 111 from the outer peripheral surface or the inner peripheral surface of the stator yoke portion 11; and the connection mode is flexible and adaptable, and the assembly between the stator tooth 12 and the stator yoke portion 11 is facilitated.

Optionally, the stator projection is formed by extending the outer peripheral surface of the stator yoke portion 11 radially outwards.

The stator projection is formed by extending the outer peripheral surface of the stator yoke portion 11 radially outwards. Optionally, the stator tooth 12 is provided with a groove. When the stator tooth 12 is connected to the stator yoke portion 11, the stator tooth 12 and the stator yoke portion 11 can be quickly assembled by inserting the groove on the stator tooth 12 into the stator projection on the outer peripheral surface of the stator yoke portion 11.

Embodiment 4

The difference from Embodiment 3 is as follows: the stator projection is formed by extending the inner peripheral surface of the stator yoke portion 11 radially inwards.

Of course, the stator projection can also be formed by extending the inner peripheral surface of the stator yoke portion 11 radially inwards. Optionally, the stator tooth 12 is provided with a groove. When the stator tooth 12 is connected to the stator yoke portion 11, the stator tooth 12 and the stator yoke portion 11 can be quickly assembled by inserting the groove on the stator tooth 12 into the stator projection on the inner peripheral surface of the stator yoke portion 11.

Optionally, the stator teeth 12 comprises a stator tooth body 121 including a plurality of second magnetic conductive sheets laminated along the radial direction or a circumferential direction of the stator core 1. The lamination direction of the second magnetic conductive sheets is perpendicular to the lamination direction of the first magnetic conductive sheets.

In this embodiment, the stator tooth 12 comprises a stator tooth body 121 including a plurality of second magnetic conductive sheets, and the magnetic permeability of the stator core 1 is further improved by laminating the plurality of second magnetic conductive sheets along the radial direction or the circumferential direction of the stator core 1.

Further, the stator tooth 12 further comprises at least one stator tooth shoe 122 arranged at an end of the stator tooth body 121 and detachably connected to the stator tooth body 121.

The stator tooth 12 further comprises a stator tooth shoe 122 arranged at the end portion of the stator tooth body 121. The stator tooth shoe 122 is detachably connected to the stator tooth body 121, so that after the winding 21 is wound on the stator tooth body 121, the stator tooth shoe 122 is connected to the stator tooth body 121. The effect of fixing the winding 21 is achieved, the winding 21 is prevented from being separated from the stator tooth body 121, and the assembling efficiency of the winding 21 and the stator tooth 12 is further improved.

It should be noted that the material of the stator tooth body and the stator tooth shoe may be the same or different.

Embodiment 5

Figure 3:
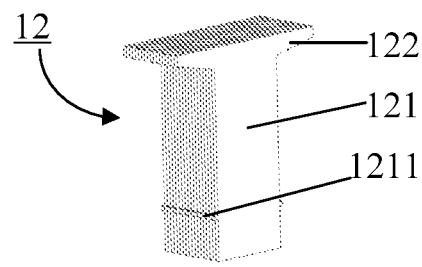
FIG. 3 is a structural schematic view of a stator tooth of the fan of FIG. 1.

The difference from Embodiment 4 is as follows: the stator tooth shoe 122 is integrally formed with the stator tooth body 121, as shown in FIG. 3.

In this embodiment, the stator tooth shoe 122 and the stator tooth body 121 are integrally formed, which simplifies the structure of the product and makes the integrity of the product better. In addition, the connecting step of the stator tooth shoe 122 and the stator tooth body 121 is omitted, and the assembling efficiency of the product is further improved.

Optionally, the number of the at least one stator tooth shoe 122 is one, and the stator tooth shoe 122 is arranged at one end of the stator tooth body 121; or the number of the at least one stator tooth shoe 122 is two, and each end of the stator tooth body 121 is provided a respective stator tooth shoe 122.

The number of the stator tooth shoes 122 arranged on each stator tooth body 121 can be adjusted according to practical requirements. For example, one stator tooth shoe 122 can be arranged on one stator tooth body 121, and two stator tooth shoes 122 can be arranged on one stator tooth body 121.

It should be noted that two stator tooth shoes 122 may be provided on both end faces of the stator tooth body 121, respectively.

Figure 14:
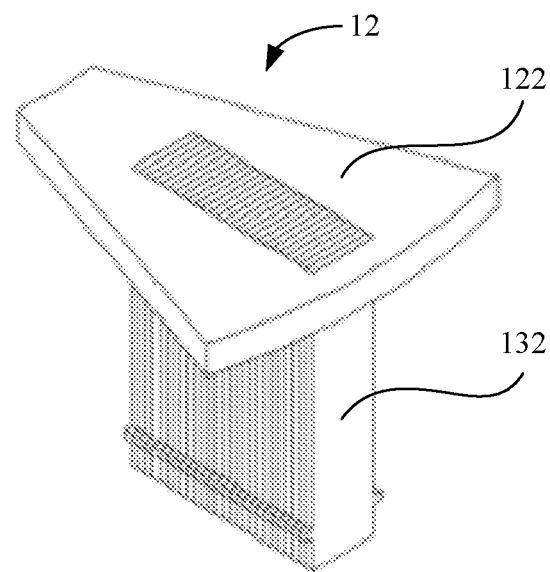
FIG. 14 is a schematic view showing an assembly structure of a stator tooth according to an embodiment of the present disclosure.
Figure 15:
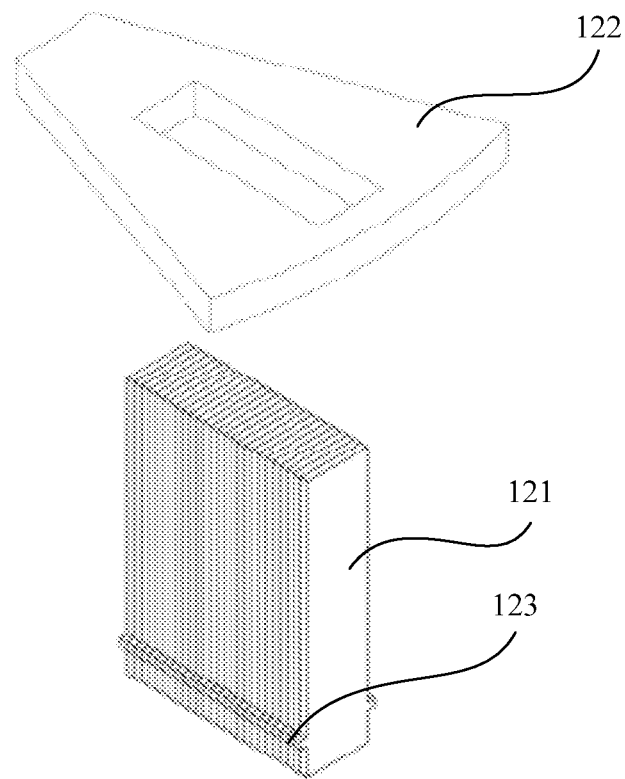
FIG. 15 is a schematic view showing a disassembled structure of the stator tooth shown in FIG. 14.

In another embodiment, as shown in FIGS. 14 and 15, the stator tooth body 121 has a straight tooth shape, a positioning rib 123 is arranged on the stator tooth body 121, the stator tooth body 121 is not provided with a matching rib or a matching groove which is matched with the stator tooth shoe 122, the stator tooth shoe 122 is directly sleeved at one end of the stator tooth body 121, and the matching position of the stator tooth shoe 122 is limited to the matching degree that the upper end surfaces of the stator tooth body 121 and the stator tooth shoe 122 are parallel.

Optionally, the fan can further comprise a positioning groove and a positioning rib 1211 which are adapted to each other in the shape. One of the positioning groove and the positioning rib 1211 is arranged on the stator tooth 12, and the other one of the positioning groove and the positioning rib 1211 is arranged on the stator yoke slot 111 and/or the stator projection so as to limit the position of the stator tooth 12 at the stator yoke portion 11

Due to the fact that the positioning ribs 1211 are arranged on the stator tooth body 121, the positioning grooves are arranged on the stator yoke slots or the stator projections, or the positioning grooves are arranged on both the stator yoke slot 111 and the stator projection, the positioning ribs 1211 are inserted into the positioning grooves to play a limiting role when the stator teeth 12 and the stator yoke portion 11 are assembled, so that the stator teeth 12 and the stator yoke portion 11 are prevented from moving relatively; further, the stability of the connection of the stator teeth 12 and the stator yoke portion 11 is improved.

In the same way, the stator tooth body 121 can be provided with a positioning groove, the positioning ribs 1211 are arranged on the stator yoke slots 111 or the stator projections, or the positioning ribs 1211 are arranged on both the stator yoke slot 111 and the stator projection, and the positioning ribs 1211 are inserted into the positioning grooves to play a limiting role when the stator teeth 12 and the stator yoke portions 11 are assembled, so that the stator teeth 12 and the stator yoke portions 11 are prevented from moving with respect to each other, and furthermore, the connection stability of the stator teeth 12 and the stator yoke portions 11 is improved.

Optionally, the stator assembly further comprises a matching groove 123 and a matching rib 1221 which are adapted to each other in the shape. One of the matching groove 123 and the matching rib 1221 is arranged on the stator tooth body 121, and the other one of the matching groove 123 and the matching rib 1221 is arranged on the stator tooth shoe 122, so that the connection of the stator tooth shoe 122 and the stator tooth body 121 is realized by the matching of the matching groove 123 and the matching rib 1221.

By arranging the matching ribs 123 on the stator tooth body 121 and arranging the matching groove 1211 on the stator tooth shoe 122, when the stator tooth shoe 122 and the stator tooth body 121 are assembled, the matching rib 1221 is directly inserted into the matching groove 123, so that the relative movement between the stator tooth shoe 122 and the stator tooth body 121 is limited, the assembling efficiency of the stator tooth shoe 122 and the stator tooth body 121 is improved, and the stability of the connection between the stator tooth shoe 122 and the stator tooth body 121 is improved.

Optionally, the number of the stator yoke slots 111 and/or the stator projections is plural, and the plurality of stator yoke slots 111 and/or stator projections are uniformly arranged on the stator yoke portions 11 around the axis of the stator core 1.

In this embodiment, the number of the stator yoke slots 111 is plural, and the plurality of stator yoke slots 111 or the stator projections are uniformly arranged on the stator yoke portion 11 around the axis of the stator core 1, so that the structure of the product is more regular. In addition, the number of the stator yoke slots 111 or stator projections is increased. Accordingly, the number of the stator teeth 12 is plural, and the plurality of stator teeth 12 are inserted into the plurality of stator yoke slots 111 corresponding thereto. Therefore, the number of the windings 21 is increased, and the power level of the stator core 1 is increased.

Figure 12:
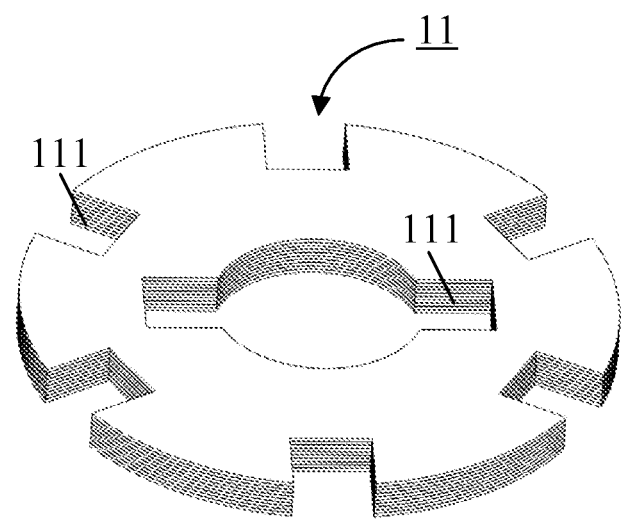
FIG. 12 is a structural schematic view of a stator yoke portion of the fan of FIG. 11.

Optionally, the stator yoke slot 111 includes a first yoke slot communicated with the outer peripheral surface of the stator yoke portion 11; and a second yoke slot communicated with the inner peripheral surface of the stator yoke portion 11, as shown in FIG. 12.

In this embodiment, by arranging the stator yoke slot 111 to include a first yoke slot communicated with the outer peripheral surface of the stator yoke portion 11 and a second yoke slot communicated with the inner peripheral surface of the stator yoke portion 11, it is possible to arrange more stator teeth 12 on the stator yoke portion 11, so that the structure thereof is more compact, the distribution of the stator teeth 12 is more uniform, and it is advantageous to further expand the motor power.

Optionally, the number of the second yoke slots is at least two, and a receiving space is formed between the stator tooth shoes 122 of at least two stator teeth 12 provided in the second yoke slot. A second rotating shaft 34 and a first fan blade 31 fixedly connected to one end of the second rotating shaft 34 are provided in the receiving space.

In this embodiment, a receiving space is formed between the two stator tooth shoes 122, and a second rotating shaft 34 and a first fan blade 31 fixedly connected to one end of the second rotating shaft 34 are arranged in the receiving space. Therefore, on one hand, the structure is compact and simple; and on the other hand, the axial direction of the second rotating shaft 34 can be the same as or different from that of the stator, so that the wind direction can be adjusted at will along with the axial change of the second rotating shaft 34, and the structural design flexibility of the fan 3 is improved.

Embodiment 6

The difference from any of the above embodiments is that on the basis of any embodiment, the fan 3 further comprises a fixing shell arranged on the stator core 1 to fix the stator core 1.

In the embodiment, the stator core 1 is fixed by the fixing shell, so that the stator core 1 can be protected from interference or intrusion of foreign matters, and the working stability and reliability of the stator core 1 can be improved.

Embodiment 7

The difference from Embodiment 6 is that on the basis of Embodiment 6, the fan 3 further comprises a casing 35 sleeved outside the motor, and the first rotating shaft 33 extends out of the casing 35.

In the embodiment, the casing 35 is arranged outside the motor, and the first rotating shaft 33 extends out of the end face of the casing 35, so that the motor can be protected, the fan 3 can be directly connected to the rotating shaft outside the casing 35, and installation convenience is improved.

It should be noted that the first rotating shaft 33 may extend out of the casing 35 by a side wall of the casing and may also extend out by an end face of the casing 35.

When the number of the first rotating shafts 33 is plural, at least two of the first rotating shafts 33 are parallel, or a non-zero angle exists between the at least two of the first rotating shafts 33.

Embodiment 8

The difference from Embodiment 7 is that on the basis of the embodiment 7, the fan 3 further comprises an end cover 36 being arranged at least one end of the casing 35. A through hole corresponding to the first rotating shaft 33 is formed in the end cover 36, and the first rotating shaft 33 passes through the through hole to extend out of the end cover 36.

In the embodiment, the end cover 36 is arranged on at least one end of the casing 35, so that the casing 35 is conveniently closed to avoid the influence of foreign matter invasion on the working of the fan 3; and the first rotating shaft 33 passes through the through hole to extend out of the end cover 36, so that it is convenient to mount the fan blades to improve the mounting convenience.

Optionally, it further comprises that the number of the stator assemblies is a first number, the number of the rotors 2 is a second number, the first number is less than the second number, and each stator assembly is arranged between any two adjacent rotors 2; and the first number is greater than the second number, and each rotor 2 is arranged between any two adjacent stator assemblies.

In this embodiment, the number of the stator assemblies is set to as a first number, the number of the rotors 2 is set to as a second number, and the first number is less than the second number, that is, the number of the stator assemblies is less than the number of the rotors 2. The stator assemblies are arranged between any two adjacent rotors, and any two adjacent rotors 2 share one stator assembly. The structure is more regular, the structure of the product is simplified, and the assembly of the rotor 2 and the stator assembly is facilitated.

Embodiment 9

The difference from Embodiment 8 is that the number of the stator assemblies is greater than that of the rotors, and each rotor 2 is arranged between any two adjacent stator assemblies, that is, any two adjacent stator assemblies share one rotor. The structure is regular, and the structure of a product is simplified, and the assembly of the rotor and the stator assembly is facilitated.

Optionally, the number of the stator assemblies is at least two, the at least two stator assemblies have the same number of stator teeth 12, or the at least two stator assemblies have the same number of phases; or the number of the stator assemblies is at least two, the at least two stator assemblies have different numbers of stator teeth 12, or the at least two stator assemblies have different numbers of phases.

In this embodiment, the number of the stator assemblies is at least two, and the at least two stator assemblies have the same number of stator teeth 12, so that the assembly of the stator teeth 12 and the stator yoke portion 11 is facilitated; or the at least two stator assemblies have the same number of phases, that is, the number of windings 21 on each stator assembly is the same, so that the power level on each stator assembly is the same.

The number of the stator assemblies is at least two, and the at least two stator assemblies have different numbers of stator teeth 12, or the at least two stator assemblies have different numbers of phases, that is, the number of windings 21 on each stator assembly is different, so that reasonable windings 21 on each stator assembly can be made by a user to meet the need for actual power.

Optionally, the number of the rotors is plural, and the number of pole-pairs of at least two of the rotors is the same.

In the embodiment, the number of the rotors is plural, the rotating shafts of at least two of the rotors can be arranged coaxially or in parallel or vertically, the arrangement mode is various, and the installation mode is flexible and adaptable.

Embodiment 10

The difference from Embodiment 9 is that the number of the rotors 2 is plural, and the number of pole-pairs of at least two of the rotors 2 are different.

In the embodiment, the number of the rotors 2 is plural, at least two of the rotors 2 can be provided with the same pole pairs, so that the rotating speeds of at least two of the rotors 2 are the same, the working of at least two of the rotors 2 is the same, and different pole pairs can be provided, so that the rotating speeds of at least two of the rotors 2 are different, and the working of at least two of the rotors 2 is different to meet the requirements of different working conditions.

As far as the type of the rotor 2 is not limited, one or more of the rotors 2 may be a permanent magnet rotor or a squirrel cage rotor or a salient pole rotor, all of which are within the scope of protection of the present disclosure since they are capable of achieving the objects of the present disclosure.

Optionally, the number of the windings 21 is plural, and each of the windings 21 is wound around at least one of the stator teeth 12.

In this embodiment, the number of the windings 21 is plural, and each of the windings 21 is wound around at least one of the stator teeth 12 to ensure that the motor can operate normally and ensure that the motor can do work to meet the requirements of the user.

Optionally, the fan 3 further comprises at least one bearing 37 connecting a rotating part and a stationary part of the motor, and the bearing 37 may be a ball bearing or a deep groove ball bearing or a thrust bearing or the like, all of which are intended to be within the scope of protection of the present disclosure since they accomplish the objects of the present disclosure.

In one embodiment, the yoke slots are of two types and comprise a first yoke slot and a second yoke slot. The first type of yoke slot is communicated with the outer peripheral surface, and the second type of yoke slot is communicated with the inner peripheral surface. In another embodiment, the first type of yoke slot is communicated with the outer peripheral surface, and the second type of yoke slot is communicated with the inner and outer peripheral surfaces. In still another embodiment, the first type of yoke slot and the second type of yoke slot are spaced apart from both the inner peripheral surface and the outer peripheral surface. In yet another embodiment, the first type of yoke slot and the second type of yoke slot are both communicated with the outer peripheral surface. In still yet another embodiment, both the first type of yoke slot and the second type of yoke slot communicate with the inner peripheral surface, and both the first type of yoke slot and the second type of yoke slot are spaced apart from the inner peripheral surface and the outer peripheral surface.

In another embodiment, the types of the yoke slots are N, and each yoke slot can be arranged at a position which is communicated with the outer peripheral surface, the inner peripheral surface, and both the inner peripheral surface and the outer peripheral surface at the same time, and is spaced from the inner peripheral surface and the outer peripheral surface.

The specific structure of the fan provided in the present disclosure is described in detail below with reference to specific embodiments.

Embodiment 1

As shown in FIGS. 1 to 3, the embodiment of the present disclosure provides a fan 3 comprising: a motor including a stator assembly and a rotor 2 (comprising magnetic steel 201 and a rotor yoke 202) arranged correspondingly to the stator assembly, wherein the stator assembly comprises a stator yoke portion 11 and at least one stator tooth 12 which are detachably connected to each other, a winding 21 is wound on the stator tooth 12, and the stator yoke portion 11 is provided with a stator yoke slot 111 which is adapted to the shape of the stator tooth 12, and the stator teeth 12 pass through the stator yoke slots 111 to form a stator core 1; and the first rotating shaft 33 is connected to the rotor 2, and a first fan blade 31 is arranged at one end of the first rotating shaft 33 so as to rotate the first fan blade 31 when the first rotating shaft 33 rotates.

Embodiment 2

Figure 4:
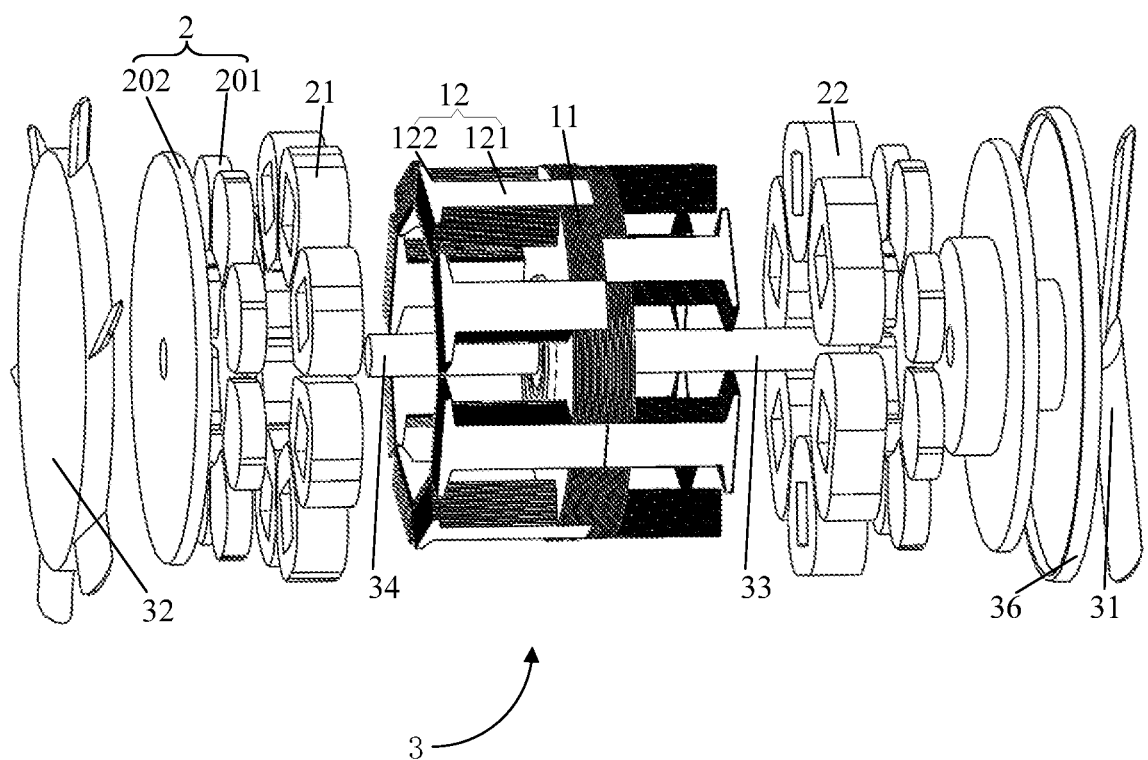
FIG. 4 is an exploded structural view of a fan according to another embodiment of the present disclosure.

As shown in FIG. 4, the difference from Embodiment 1 is as follows: two fans 3 with the structure shown in Embodiment 1 are adopted and are oppositely arranged in the back direction. Namely, the two fans 3 share one stator yoke portion 11, and the stator yoke portion 11 is provided at both ends with asymmetric stator yoke slots 111 respectively.

Embodiment 3

Figure 5:
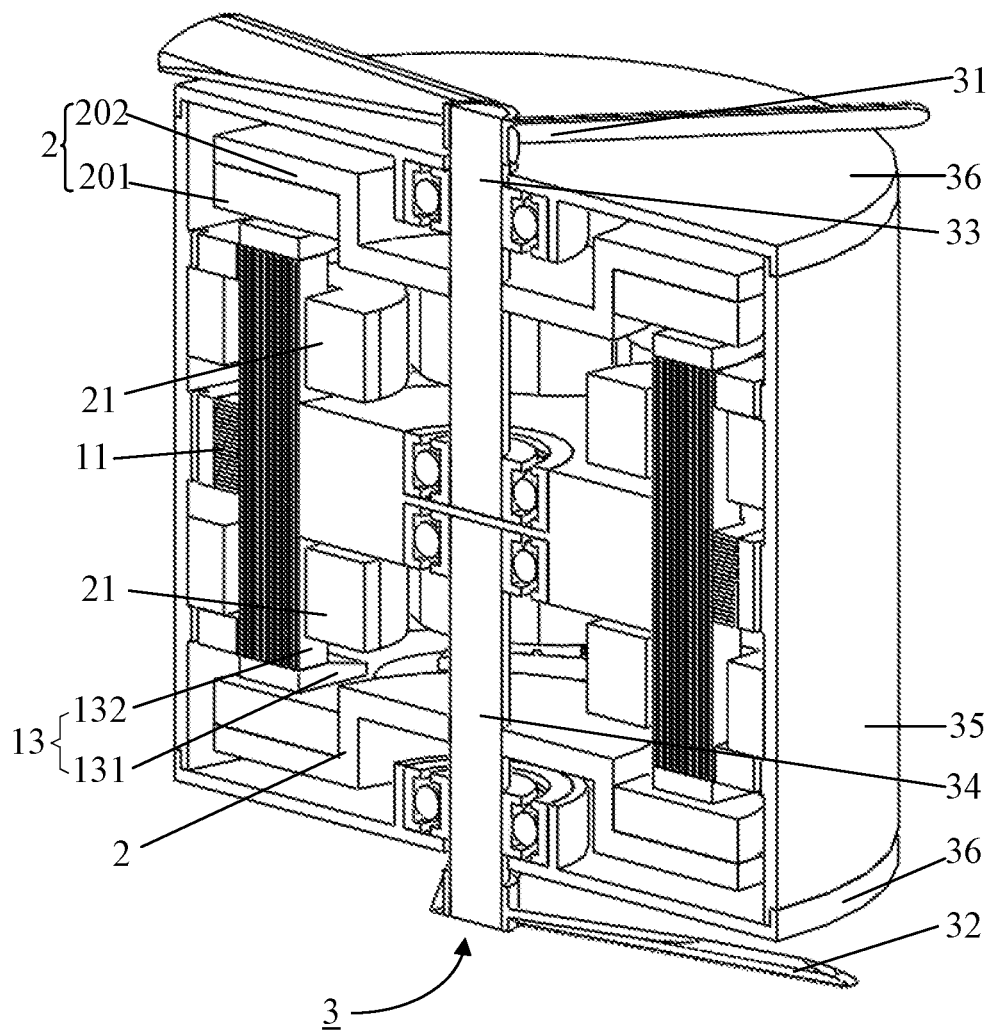
FIG. 5 is a schematic view showing a three-dimensional structure of a fan according to yet another embodiment of the present disclosure.
Figure 7:
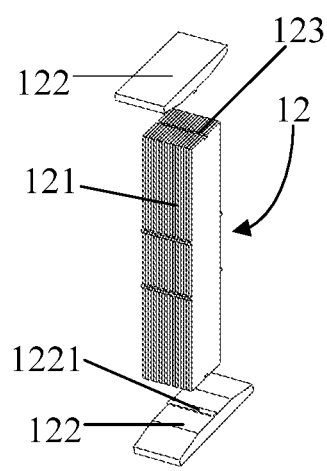
FIG. 7 is a structural schematic view of a stator tooth of the fan of FIG. 5.

As shown in FIGS. 5 to 7, the difference from Embodiment 1 is as follows: both ends of the stator tooth 12 extend out of the stator yoke portion 11, both ends of the stator tooth 12 are wound with windings 21 respectively, and two rotors 2 are arranged at both ends of the stator assembly.

Embodiment 4

Figure 8:
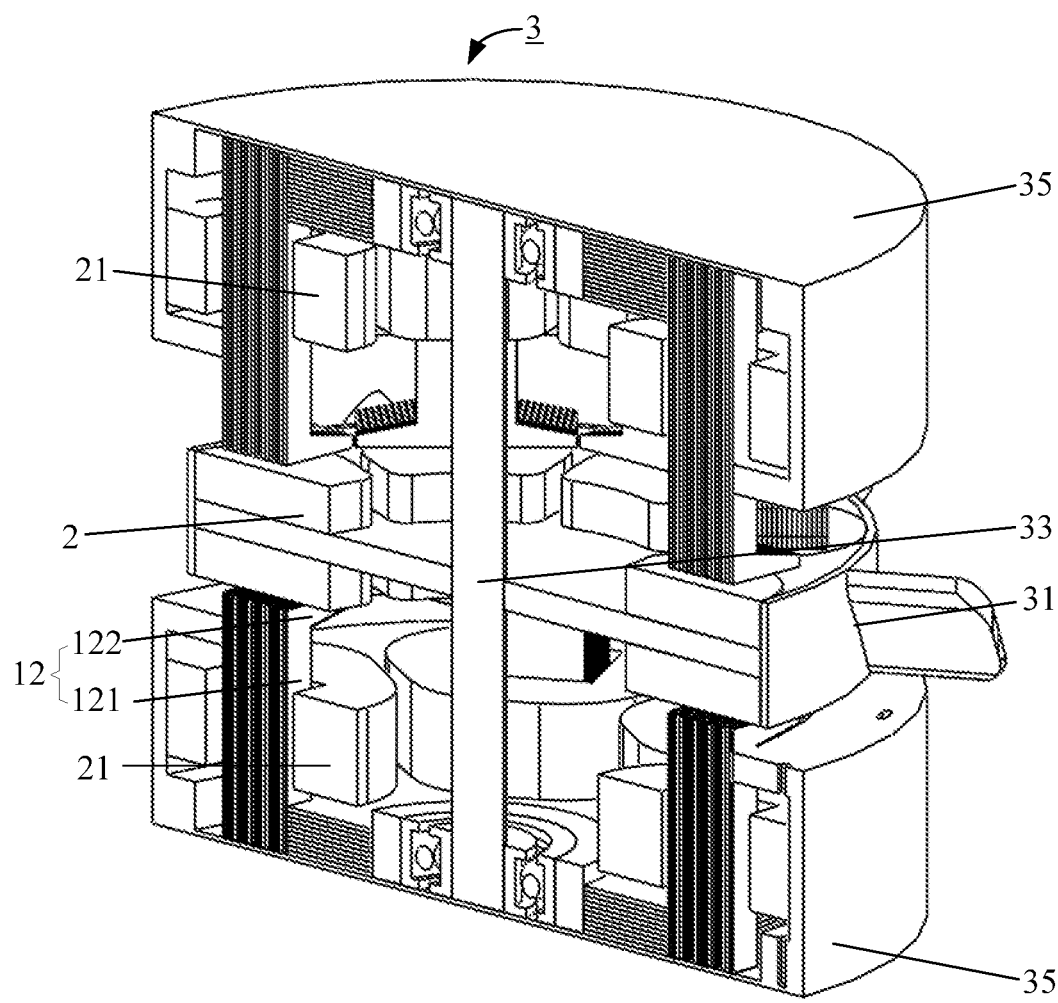
FIG. 8 is a schematic view showing a three-dimensional structure of a fan according to yet another embodiment of the present disclosure.

As shown in FIG. 8, the difference from Embodiment 3 is as follows: the fan 3 comprises two stator assemblies and a rotor 2 arranged between the two stator assemblies, two windings 21 are arranged at one end, far away from the rotor 2, of the two stator assemblies, and a first fan blade 31 is sleeved outside the rotor 2.

Embodiment 5

Figure 9:
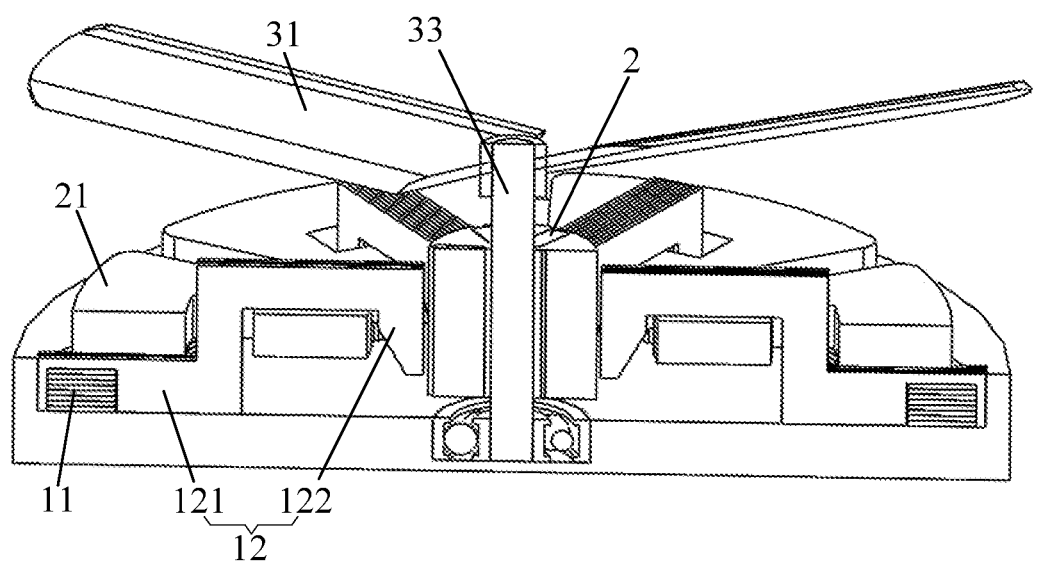
FIG. 9 is a schematic view showing a three-dimensional structure of a fan according to yet another embodiment of the present disclosure.
Figure 10:
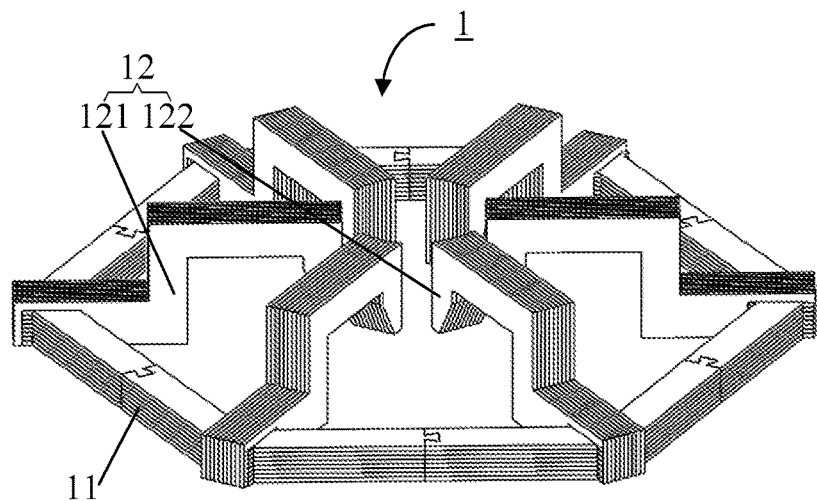
FIG. 10 is a structural schematic view of a stator core of the fan of FIG. 9

As shown in FIGS. 9 and 10, the present embodiment provides a stator assembly particularly for a fan 3, in which the stator teeth 12 are of a spoon type, the stator yoke portion 11 is of a ring shape, the stator teeth 12 pass through the ring-shaped stator yoke portion 11, and a plurality of stator tooth shoes 122 are wound around the rotor 2 at a central position of the ring-shaped stator yoke portion 11.

Embodiment 6

Figure 13:
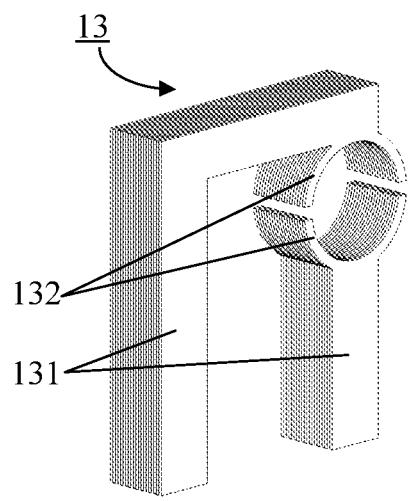
FIG. 13 is a structural schematic view of a stator tooth of the fan of FIG. 11.

As shown in FIGS. 11 to 13, the difference from Embodiment 1 is as follows: on the basis of Embodiment 1, a novel fan 3 is further added to the right side of the stator yoke portion 11. For example, the stator core 1 includes a stator tooth 12 and a second stator tooth 13 including a second stator tooth body 131 and a second stator tooth shoe 132, and the stator tooth 12 passes through the stator yoke slot 111 communicated with the outer peripheral surface of the stator yoke portion 11; one end of the second stator tooth 13 passes through the stator yoke slot 111 communicated with the inner peripheral surface of the stator yoke portion 11, and the other end of the second stator tooth 13 extends rightwards; and a receiving space for receiving the rotor 2 is arranged between the two second stator tooth shoes 132, the rotor 2 and the bearing 37 are arranged in the space, and a fan blade is arranged at one end of the bearing 37.

In summary, according to the fan provided by the disclosure, the stator assembly comprises a stator yoke portion and at least one stator tooth which are detachably connected to each other, a winding is wound on the stator tooth, the stator yoke portion is provided with a stator yoke slot which is adapted to the shape of the stator tooth, and the stator tooth passes through the stator yoke slot to form a stator core. This structure is simple and compact, the winding process is convenient and easy to operate, and the power expansion capacity of the motor is good; and the rotor and the first fan blade are connected by the first rotating shaft, so that the first fan blade can be driven to rotate by the first rotating shaft when the rotor rotates, and the wind power generated by the first fan blade can also be expanded along with the expansion of the motor power.

In this application, the terms "first", "second", "third" are used for descriptive purposes only and are not to be construed as indicating or implying relative importance; the term "plurality" refers to two or more, unless explicitly defined otherwise. The terms "mounted", "connected", "connecting", "fixed", and the like are to be construed broadly, e.g., "connecting" may be a fixed connection, a removable connection, or an integral connection; "connected" may be directly connected or indirectly connected by an intermediary. The specific meaning of the above terms in this application will be understood in specific circumstances by those of ordinary skill in the art.

In the description of the present disclosure, it should be understood that the directional or positional relationships indicated by the terms "upper", "lower", "left", "right", "front", "back" and the like are based on the directional or positional relationships shown in the drawings. It is merely for the purpose of describing the present disclosure and simplifying the description, and is not intended to indicate or imply that a particular orientation, configuration and operation of the referenced device or unit is required and should not be construed as limiting the present disclosure.

In the description of this description, reference to the terms "an embodiment", "some embodiments", and "a specific embodiment", etc., means that specific features, structures, materials, or characteristics described in connection with the embodiment or example is included in at least one embodiment or example of the application. In the present specification, schematic statement of the above terms do not necessarily refer to the same embodiment or example. Furthermore, the particular features, structures, materials, or characteristics described may be combined in any suitable manner in any one or more embodiments or examples.

The above mentioned are merely preferred embodiments of the present disclosure and not intended to limit the disclosure. The disclosure may have various modifications and changes for those skilled in the art. Any modifications, equivalents, improvements, etc. within the spirit and principles of this application are intended to be included within the scope of this application.

What is claimed is:

1. A fan comprising:
   a motor comprising:
      at least one stator assembly comprising a stator yoke portion and at least one stator tooth,
         wherein the stator yoke portion and the at least one stator tooth are detachably connected to each other,
         wherein the stator yoke portion is provided with a stator yoke slot adapted to a shape of the at least one stator tooth,
         wherein the at least one stator tooth comprises a stator tooth body that is inserted into the stator yoke slot to form a stator core, and
         wherein the stator tooth body extends from the stator yoke portion in an axial direction of the stator core;
      at least one rotor arranged correspondingly to the at least one stator assembly; and
      at least one winding wound on the stator tooth body of the at least one stator tooth;
   a first fan blade;
   a first rotating shaft connected to one of the at least one rotor to extend in the axial direction of the stator core,
      wherein the first fan blade is arranged at one end of the first rotating shaft and is rotated by rotation of the first rotating shaft; and
   a positioning groove and a positioning rib adapted to each other in the shape of the at least one stator tooth,
   wherein:
      one of the positioning groove and the positioning rib is arranged on the at least one stator tooth, and the other of the positioning groove and the positioning rib is arranged on the stator yoke slot so as to limit a position of the at least one stator tooth at the stator yoke portion; and
      the positioning rib protrudes along a radial direction of the stator core.

2. The fan according to claim 1, wherein the stator yoke portion comprises a plurality of first magnetic conductive sheets laminated along the radial direction or the axial direction of the stator core.

3. The fan according to claim 1, wherein:
   the stator yoke portion has a ring shape, an oval ring shape, or a polygonal ring shape; and
   the stator yoke slot extends through at least one end surface of the stator yoke portion in the axial direction of the stator core.

4. The fan according to claim 1, wherein the stator yoke slot comprises at least two yoke slots, each of which has:
   a distance between the stator yoke slot and an outer peripheral surface of the stator yoke portion in the radial direction of the stator core, and a distance between the stator yoke slot and an inner peripheral surface of the stator yoke portion in the radial direction; or
   wherein the stator yoke slot communicates with the outer peripheral surface and/or the inner peripheral surface of the stator yoke portion.

5. The fan according to claim 1, wherein:
   the stator yoke portion comprises:
      a plurality of first magnetic conductive sheets laminated along the radial direction or the axial direction of the stator core; and
   the at least one stator tooth comprises:
      a plurality of second magnetic conductive sheets laminated along the radial direction or a circumferential direction of the stator core.

6. The fan according to claim 5, wherein a lamination direction of the second magnetic conductive sheets is perpendicular to a lamination direction of the first magnetic conductive sheets.

7. The fan according to claim 1, wherein the number of the stator yoke slots is plural, and the plurality of stator yoke slots are uniformly arranged on the stator yoke portion around an axis of the stator core.

8. The fan according to claim 4, wherein the stator yoke slot comprises:
- at least two yoke slots, each of which has a distance between the stator yoke slot and the outer peripheral surface of the stator yoke portion in the radial direction, and a distance between the stator yoke slot and the inner peripheral surface of the stator yoke portion in the radial direction; or
- at least two yoke slots, wherein each of the yoke slots is communicated with the outer peripheral surface and/or the inner peripheral surface of the stator yoke portion.

9. The fan according to claim 1, further comprising:
- a casing sleeved outside the motor, wherein the first rotating shaft extends out of the casing, the fan blade is sleeved on the first rotating shaft, and the fan blade is arranged outside the casing.

10. The fan according to claim 1, wherein the at least one winding comprises a plurality of windings, and each winding is wound on a respective stator tooth.

11. The fan according to claim 1, wherein the material of the stator yoke portion and the at least one stator tooth comprises at least one of a soft magnetic material or a solid material.

* * * * *